(No Model.) 2 Sheets—Sheet 1.

J. B. HURD.
HOEING MACHINE.

No. 430,209. Patented June 17, 1890.

Witnesses:
M. A. Hurd
E. M. C. Nichols

Inventor:
Judson B. Hurd (No Model.) 2 Sheets—Sheet 2.
J. B. HURD.
HOEING MACHINE.

No. 430,209. Patented June 17, 1890.

Witnesses:
M. A. Hurd
E. M. E. Nichols

Inventor:
Judson B. Hurd.

UNITED STATES PATENT OFFICE.

JUDSON B. HURD, OF SAN ANTONIO, TEXAS.

HOEING-MACHINE.

SPECIFICATION forming part of Letters Patent No. 430,209, dated June 17, 1890.

Application filed March 1, 1890. Serial No. 342,312. (No model.)

*To all whom it may concern:*

Be it known that I, JUDSON B. HURD, a citizen of the United States, residing at San Antonio, in the county of Bexar and State of Texas, have invented a new and useful Hoeing-Machine, of which the following is a specification.

My invention relates to that class of hoeing-machines in which there is an independently-moving indicating device adapted to be moved ahead of the blades or hoes, and is used to point out the particular plant to be saved and hoed; and the objects of my improvements are, first, to provide such mechanism as will cause the hoes to cultivate around the particular plant pointed out without it being necessary for the indicator to remain at rest while each plant is being hoed; second, to provide a pair of oscillating disks that cultivate before and behind the plant as they oscillate across the row. By the use of these I avoid the necessity of driving or guiding the machine so exactly as is necessary where the disks are set facing forward and hoe around the plant by being forced apart to allow the plant to pass between them. I attain these objects by the mechanism illustrated in the accompanying drawings, in which—

Figure 1:
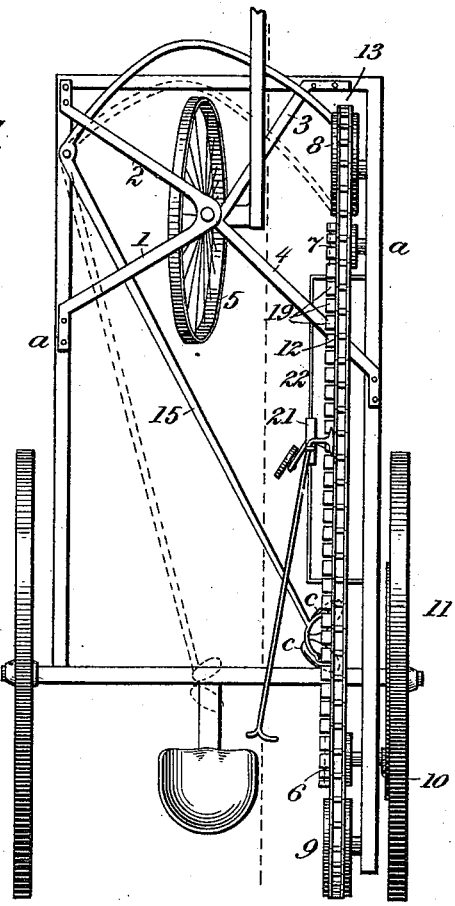
Figure 3:
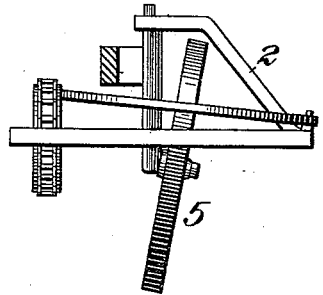
Figure 4:
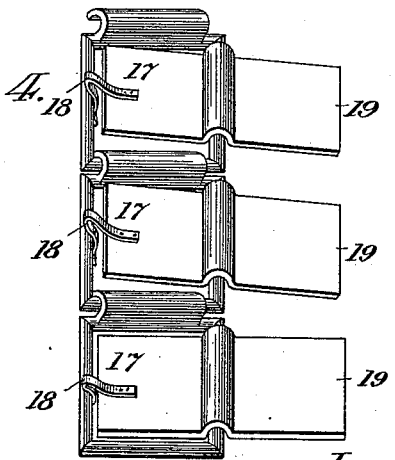
Figures 2, 5:
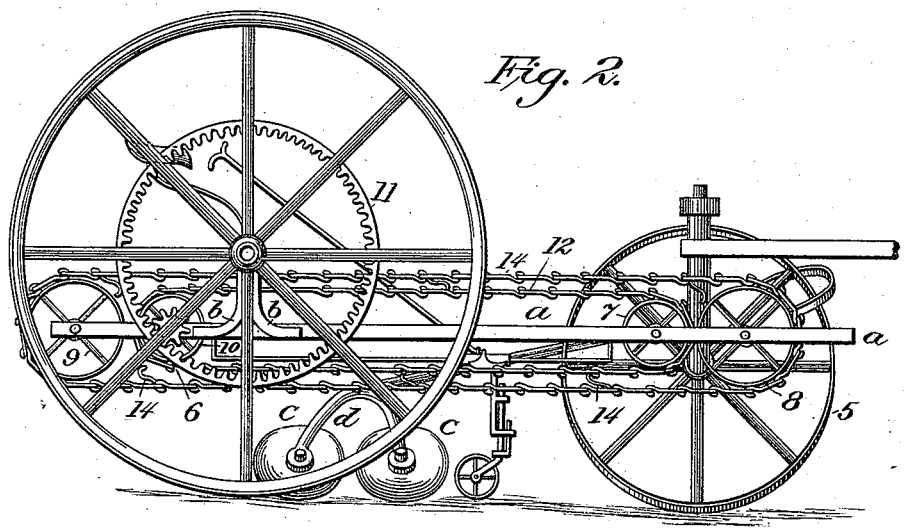

Figure 1 is a top view of the machine. Fig. 2 is a side view of the same. Fig. 3 is a front view of the front end of the machine, showing the position of the front wheel, the frame that supports it, &c. Fig. 4 shows a section of the chain belt 12, and Fig. 5 a detailed view in perspective of the indicator.

Similar letters and figures refer to similar parts throughout the several views.

The frame A, by means of the braces $b$, is suspended at its rear end under the axle of the large wheels, and by means of the diagonal braces 1 2 3 4 it is attached to the front wheel 5. On the right-hand side of the frame A the pulleys 6 7 8 9 and the pinion 10 have their bearings. The cogged rim 11, which is secured to the spokes of one of the large wheels, drives the pinion 10, which is on the same shaft with the pulleys 6 and 7, and the chain belt 12 is thereby moved at the same rate of speed as the outside rim or tire of the large wheel. From this it follows that when any link in the lower portion of the chain 12 in its movement rearward is opposite a particular plant in the row this link remains opposite this same plant until it passes the center of the pulley 6. The chain belt 13, which is carried by the pulleys 8 and 9, is provided with a series of hooks 14. These hooks stand in a position to catch into the open links of the chain 12 as it passes rearward.

C C are disks formed like a saucer and are set obliquely, their upper edges leaning from each other and their concave surfaces outward and downward, whereby their edges which are sharpened will cut and turn the soil when they revolve. These disks are set facing across the row and are far enough apart at their lower edges to allow a plant to pass between them. The upright shanks $d$, which have bearings at their lower ends for the axles of the disks, meet together above and are rigidly fixed to the long arm 15. This arm 15 and the curved arm 16 are rigidly fastened together and are pivotally attached to the forward left-hand corner of the frame A. The other end of the curved arm 16 has a pivotal attachment to the rim of the pulley 8. Each link of the chain 12 is provided with a shutter 17, whereby the opening in the link is closed and the hooks 14 prevented from catching into the link. The spring-catch 18 on each shutter is adapted to hold the shutter with sufficient force to prevent its being opened or closed by its own weight or by the jar of the machine. Each shutter has also an extended end or platform 19, upon which the presser-foot 20 of the indicator slides.

The indicator consists of the sleeve 21, which slides upon the rod 22, to which sleeve is fixed the hanger 23 and the loop 24. The vertical shank of the caster-wheel 25 has its bearing in the hanger 23, and the lower end of the handle 26 passes through the loop 24. The lower end of the handle terminates in a crank, to which is fixed the presser-foot 20. The shank 28 is allowed to move up and down in its bearings in order that the wheel 25 may adjust itself to the surface of the ground.

The pointer 27 reaches out over the row of plants and moves up and down with the caster-wheel 25; but the other end is turned up and passes through an opening in the hanger 23, so as to prevent the pointer from swinging out of place.

The operation is as follows: The operator holding the handle can move the indicator faster or slower than the machine is moving or stop it entirely for an instant, and by this means he is enabled to see when the pointer 27 is exactly over the plant he desires to hoe. Then by a slight turn of the wrist the presser-foot 20 is pressed upon the platform 19 of the link that is opposite the plant selected. This lifts the shutter 17 of that link. When this link in its course backward reaches a point opposite the opening between the disks, it comes in contact with a hook on the chain 13. The hook catches into the open link and is pulled back until the pulley 8 makes an entire revolution. By this time the hook has reached the pulley 6 and is forced out of the link. The chain 13 then remains at rest until another hook is caught in the same way. The revolution of the pulley 8 carries the end of the curved arm back and forward again and oscillates the disks across the row. The arm 15 having the proper inclination, the disks are made to cut at right angles across the row. Thus the plant exactly opposite the open link is hoed before and behind by the disks without the necessity of driving so exact as would be necessary if the disks were faced to run with the row. The hooks are placed on the belt at suitable distances from each other, so that when one is forced out of a link another is left exactly opposite the space between the disks. The shutters 17 are closed when they come in contact with the pulley 6, and remain so until forced open again by the indicator.

A pair of cutting-disks set obliquely are used by me in another machine; but they face to run with the row, and in their use it is necessary to guide them exactly over the row. In this machine they are set to cut across the row, and as they cut a lateral furrow of several inches in length at each stroke they cut before and behind the plant without the necessity of driving so exact. The cultivation on the sides of the plants can easily be done by other blades.

An independently-moving indicator has been used by me in a hoeing-machine heretofore, and is the subject of another patent. I do not, therefore, claim it, broadly, in this; but in those machines it is necessary for the indicator to remain at rest after pointing out a plant until the blades hoe around it, while in this machine the indicator is used in connection with mechanism which insures the hoeing of the plant pointed out without the necessity of the indicator remaining at rest while it is done. This is a great saving of time and enables the operator to manage the machine and point out the plants with greater ease and exactness. One of the principal elements in the mechanism which performs this function is the link belt or chain 12, a portion of which moves backward at the same speed that the machine moves forward and remains in the same position in relation to the plant from the time the plant is indicated until it is hoed. This function of communicating between the indicator and the hoeing-blades is a new function introduced in hoeing-machines, and the chains 12 and 13 I may call the "communicating" devices or mechanism. There are other things that might be substituted for these belts in their present form; but a machine with this function being new and original I claim whatever devices are used to perform this function in substantially the same way as an equivalent communicating mechanism. It will also be readily seen that nearly every part of the machine is susceptible of many variations in form, the machine still retaining the same combination of elements performing the same functions.

I therefore claim as new without confining myself to specific construction of parts—

1. A hoeing-machine in which are combined the following elements, viz: first, a pair of oscillating disks or other equivalent hoeing device; second, an independently-moving indicator adapted to be moved forward more rapidly than the hoeing device and take a position in reference to the plant to be hoed, and by a movement made while in that position so adjust or act upon the communicating device as to cause the disks or blades to hoe such plant when they reach it; third, a communicating device or mechanism forming a means of communication between the indicator and the hoeing device, by which a movement of the indicator made while in a certain position in reference to a plant will be communicated to the hoeing device and cause the plant to be hoed.

2. In a hoeing-machine, a pair of oscillating disks set obliquely and arranged to cut a furrow across the row before and behind the hill or plants to be saved, as and for the purposes specified.

3. The combination, in a hoeing-machine, of the independently-moving indicator (shown in Fig. 5) with belt or chain 12 and communicating mechanism, for the purposes specified.

4. A hoeing-machine in which are combined the following elements or instrumentalities, to wit: first, an indicating device adapted to be operated to point out the plant to be hoed by taking a position in reference to said plant, and while in that position to act upon the communicating mechanism which operates the means of cultivation; second, a communicating mechanism adapted to be acted upon by the indicator and to communicate motion to or actuate the hoeing devices or means of cultivation, whereby the plant will be hoed; third, hoeing devices or means of cultivation having disks or blades adapted to hoe close to small plants and between the hills in a row.

5. The combination, in a hoeing-machine, of frame A, oscillating disks C, set as described, arms 15 and 16, with link belt 12, chain belt 13, with hooks 14, shutters 17, and indicating device having handle-bar 26, presser-foot 20, pointer 27, caster-wheel 25, sleeve 21, and sliding rod 22, or their equivalents.

JUDSON B. HURD.

In presence of—
 WM. H. YOUNG,
 D. H. TOOMEY.